United States Patent
Lee

(10) Patent No.: US 11,555,708 B2
(45) Date of Patent: Jan. 17, 2023

(54) APPARATUS AND METHOD FOR DETECTING DEVIATION VEHICLE

(71) Applicants: HYUNDAI MOTOR COMPANY, Seoul (KR); KIA MOTORS CORPORATION, Seoul (KR)

(72) Inventor: Yongho Lee, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 86 days.

(21) Appl. No.: 17/174,693

(22) Filed: Feb. 12, 2021

(65) Prior Publication Data
US 2022/0065635 A1 Mar. 3, 2022

(30) Foreign Application Priority Data
Aug. 31, 2020 (KR) .................. 10-2020-0110524

(51) Int. Cl.
*G01C 21/34* (2006.01)
*G01C 21/36* (2006.01)
(Continued)

(52) U.S. Cl.
CPC ........ *G01C 21/3415* (2013.01); *B60W 50/16* (2013.01); *B60W 60/0024* (2020.02); *B60W 60/0051* (2020.02); *B60W 60/0053* (2020.02); *G01C 21/3626* (2013.01); *G05D 1/0212* (2013.01); *B60W 2520/10* (2013.01);
(Continued)

(58) Field of Classification Search
None
See application file for complete search history.

(56) References Cited

U.S. PATENT DOCUMENTS

| | | | |
|---|---|---|---|
| 2018/0003516 A1* | 1/2018 | Khasis | G08G 1/207 |
| 2019/0235514 A1* | 8/2019 | Lin | G08G 1/096725 |
| 2021/0253104 A1* | 8/2021 | Takamatsu | B60W 30/18163 |

FOREIGN PATENT DOCUMENTS

| | | | |
|---|---|---|---|
| JP | 2010127875 A | * | 6/2010 |
| JP | 2019020130 A | * | 2/2019 |

OTHER PUBLICATIONS

Machine translation of JP 2019020130 A (Year: 2019).*
Machine translation of JP-2010127875-A (Year: 2010).*

* cited by examiner

*Primary Examiner* — Anne Marie Antonucci
*Assistant Examiner* — Kyle S Park
(74) *Attorney, Agent, or Firm* — Morgan, Lewis & Bockius LLP

(57) ABSTRACT

A vehicle includes: an input configured to receive a destination; a display; a driver assistance system configured to control a behavior of the vehicle based on surrounding environment information; and a controller configured to control the display to display a driving route. The controller may be configured to determine, when a distance between a branch point on the driving route and the vehicle reaches a first distance, a possibility that the vehicle deviates from the driving route based on GPS information, vehicle speed information, and the surrounding environment information, and search for, when the possibility is greater than or equal to a preset threshold, a deviation route for reaching the destination based on the deviated direction and control the display to display the deviation route until the distance between the branch point on the driving route and the vehicle reaches a second distance.

16 Claims, 7 Drawing Sheets

(51) Int. Cl.
   *G05D 1/02* (2020.01)
   *B60W 60/00* (2020.01)
   *B60W 50/16* (2020.01)
(52) U.S. Cl.
   CPC ..... *B60W 2520/12* (2013.01); *B60W 2552/10* (2020.02); *B60W 2555/60* (2020.02); *B60W 2556/60* (2020.02)

APPARATUS AND METHOD FOR DETECTING DEVIATION VEHICLE

CROSS-REFERENCE TO RELATED APPLICATION(S)

The present application claims the benefit of priority to Korean Patent Application No 10-2020-0110524, filed on Aug. 31, 2020 in the Korean Intellectual Property Office, the entire contents of which is incorporated herein for all purposes by this reference.

TECHNICAL FIELD

The present disclosure relates to a vehicle and a control method thereof that capable of detecting and providing a new route in advance by determining possibility of vehicle deviating from a driving route in advance to prevent deviation from the driving route, or by determining departure of the driving route.

BACKGROUND

A vehicle is a type of transportation that can move humans, objects, or animals from one location to another while driving along a road or track. Examples of the vehicle may include a three-wheeled or four-wheeled vehicle, a two-wheeled vehicle such as a motorcycle, a construction machine, a prime mover bicycle, a bicycle, and a train running on a track.

In general, a vehicle is provided with a navigation device that searches for and provides a driving route from a current location to a destination.

When the vehicle deviates from the driving path provided by the navigation device, the navigation device searches for a new path, and the driver is temporarily not provided with the driving route by continuously receiving the previously provided driving route while the navigation device re-searches the route or by receiving a re-search loading indication.

The information included in this Background section is only for enhancement of understanding of the general background of the present disclosure and may not be taken as an acknowledgement or any form of suggestion that this information forms the prior art already known to a person skilled in the art.

SUMMARY

An object of the present disclosure is to provide a vehicle and a controlling method thereof for preventing deviation of a driving route or providing a new driving route after departure before the vehicle deviates from the driving route provided by a navigation device.

In accordance with an aspect of the present disclosure, a vehicle may include: an input configured to receive a destination; a display; a driver assistance system configured to control a behavior of the vehicle based on surrounding environment information acquired through a vehicle sensor; and a controller configured to control the display to display a driving route searched based on the destination. The controller may be configured to determine a possibility that the vehicle deviates from the driving route based on GPS information, vehicle speed information, and the surrounding environment information when a distance between a branch point on the driving route and the vehicle reaches a first distance, and, when the possibility is greater than or equal to a preset threshold and the behavior of the vehicle cannot be controlled to follow the driving route through the driver assistance system, search for a deviation route for reaching the destination based on the deviated direction and control the display to display the deviation route until the distance between the branch point on the driving route and the vehicle reaches a second distance.

The controller may be configured to control the display to display the driving route and search for the deviation route at the same time.

The controller may be configured to control the display to display both of the driving route and the deviation route.

The controller may be configured to control the display to distinguish a first guide line guiding the driving route and a second guide line guiding the deviation route.

The controller may be configured to set at least one of the color, thickness, or type of the first guide line and the second guide line to be different.

The controller may be configured to control the driver assistance system so that the vehicle follows the driving route if it is possible to control the behavior of the vehicle to follow the driving route through the driver assistance system until the distance between the branch point on the driving route and the vehicle reaches the second distance.

The controller may be configured to control the driver assistance system so that the vehicle follows the driving route only when a user input allowing intervention of the driver assistance system is received through the input.

The controller may be configured to deprive the driver's control authority when controlling the driver assistance system so that the vehicle controls the driving route, and restore the driver's control authority when the user input for requesting restoration of the control authority is received through the input.

The vehicle may further include a warning unit configured to output at least one of visual warning, an audible warning, and a tactile warning, and the controller may be configured to control the warning unit to output at least one of the visual warning, the audible warning, and the tactile warning if it is possible to control the behavior of the vehicle to follow the driving route through the driver assistance system until the distance between the branch point on the driving route and the vehicle reaches the second distance.

The controller may be configured to change at least one of the first distance and the second distance based on at least one of speed limit information, the number of lanes, and the vehicle speed information of the road on which the vehicle is running.

In accordance with another aspect of the present disclosure, a controlling method of a vehicle including a driver assistance system controlling a behavior of the vehicle based on surrounding environment information acquired through a vehicle sensor may include: searching for a driving route based on a destination inputted through an input; controlling a display to display the driving route; when a distance between a branch point on the driving route and the vehicle reaches a first distance, determining a possibility that the vehicle deviates from the driving route based on Global Positioning System (GPS) information, vehicle speed information, and the surrounding environment information; when the possibility is greater than or equal to a preset threshold and the behavior of the vehicle cannot be controlled to follow the driving route through the driver assistance system, searching for a deviation route for reaching the destination based on the deviated direction until the distance between the branch point on the driving route and the vehicle reaches a second distance; and controlling the display to display the deviation route.

The searching for the deviation route to reach the destination may perform at the same time with controlling the display to display the driving route.

The controlling the display to display the deviation route may include controlling the display to display both of the driving route and the deviation route.

The controlling the display to display both of the driving route and the deviation route may include controlling the display to distinguish a first guide line guiding the driving route and a second guide line guiding the deviation route.

The controlling the display to distinguish the first guide line guiding the driving route and the second guide line guiding the deviation route may include setting at least one of the color, thickness, or type of the first guide line and the second guide line to be different.

The method may further comprise: controlling the driver assistance system so that the vehicle follows the driving route if it is possible to control the behavior of the vehicle to follow the driving route through the driver assistance system until the distance between the branch point on the driving route and the vehicle reaches the second distance.

The controlling the driver assistance system so that the vehicle follows the driving route may perform only when a user input allowing intervention of the driver assistance system is received through the input.

The controlling the driver assistance system so that the vehicle follows the driving route may include depriving the driver's control authority; and restoring the driver's control authority when the user input for requesting restoration of the control authority is received through the input.

The method may further include outputting at least one of a visual warning, a audible warning, and a tactile warning if it is possible to control the behavior of the vehicle to follow the driving route through the driver assistance system until the distance between the branch point on the driving route and the vehicle reaches the second distance.

The method may further include changing at least one of the first distance and the second distance based on at least one of speed limit information, the number of lanes, and the vehicle speed information of the road on which the vehicle is running.

BRIEF DESCRIPTION OF THE DRAWINGS

The objects, features and advantages of the present disclosure will be more apparent from the following detailed description in conjunction with the accompanying drawings, in which.

DETAILED DESCRIPTION

Figure 1:
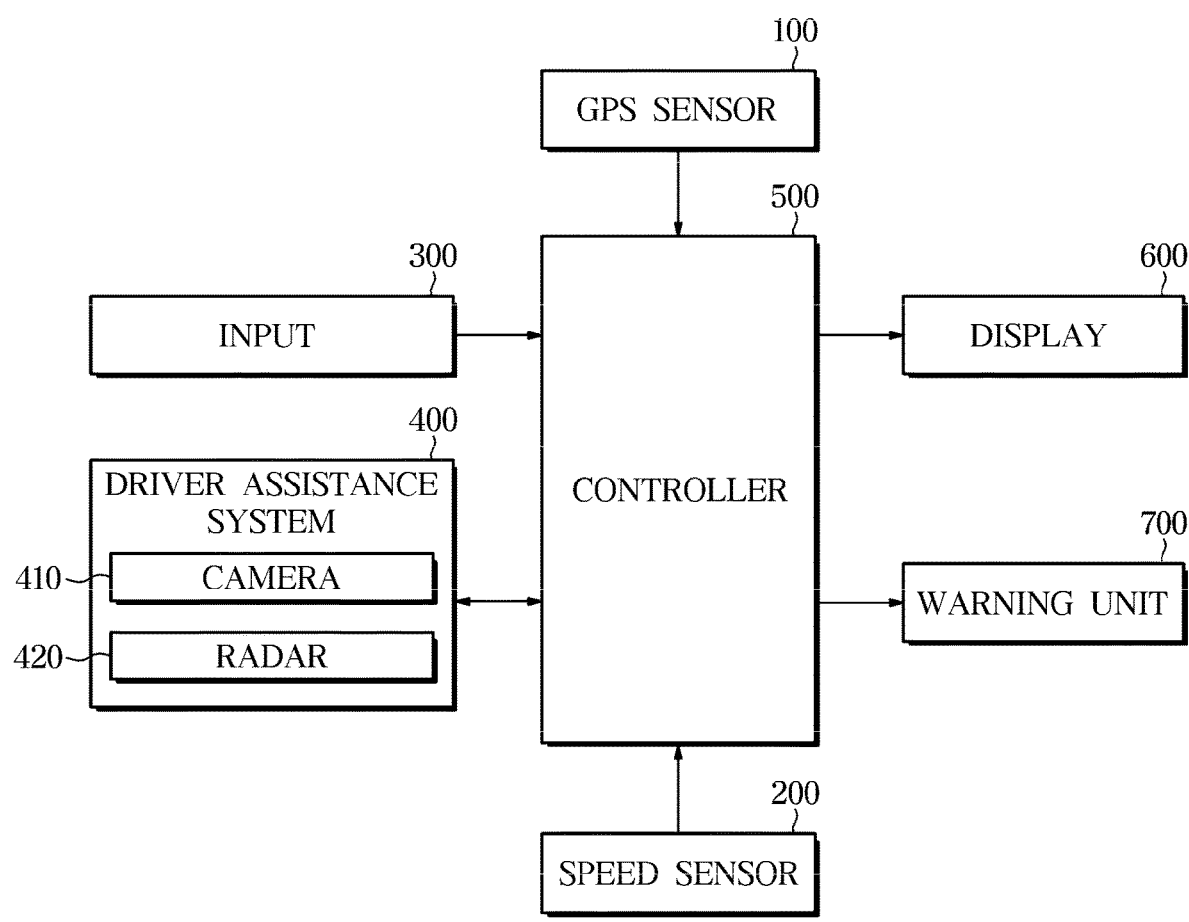
FIG. 1 is a control block diagram showing a configuration of a vehicle according to an exemplary embodiment of the present disclosure.

Advantages and features of the present disclosure, as well as methods and apparatus for achieving them, will become apparent with reference to the embodiments described below together with the accompanying drawings. However, the present disclosure is not limited to the embodiments disclosed below, but may be implemented in various different forms, only the disclosed embodiments are provided to complete the disclosure of the present disclosure, and to completely inform the scope of the present disclosure to those of ordinary skill in the art to which the present disclosure belongs, the present disclosure is only defined by the scope of the claims.

The terms used in the disclosed specification will be briefly described, and the present disclosure will be described in detail.

As for terms used in the present disclosure, general terms that are currently widely used as possible are selected while considering functions in the present disclosure, but this may vary according to the intention or precedent of a person skilled in the art, the emergence of new technologies, and the like. In addition, in certain cases, there are terms arbitrarily selected by the applicant, and in this case, the meaning of the terms will be described in detail in the description of the corresponding disclosure. Therefore, the terms used in the present disclosure should be defined based on the meaning of the term and the overall contents of the present disclosure, not a simple name of the term.

In addition, when a part is said to "include" a certain component, this means that it may further include other components, except to exclude other components unless otherwise stated. Singular expressions include plural expressions unless the context clearly indicates an exception. The term 'part, module, member, block' used in the specification may be implemented in software or hardware, and a plurality of 'part, module, member, block' may be embodied as one component. It is also possible that one 'part, module, member, block' includes a plurality of components. For example, the terms may refer to at least one hardware such as Field-Programmable Gate Array (FPGA)/Application Specific Integrated Circuit (ASIC), at least one software stored in a memory, or at least one process processed by a processor. The symbols attached to each step are used to identify each step, and these symbols do not indicate the order of each step, and each step is executed differently from the specified order unless a specific order is clearly stated in the context.

Hereinafter, embodiments of a vehicle and a method for controlling a vehicle will be described in detail with reference to the accompanying drawings so that those of ordinary skill in the art to which the present disclosure pertains can easily implement it. In addition, in order to clearly describe the present disclosure disclosed in the drawings, parts not related to the description will be omitted. In addition, in the drawings, the same reference numerals denote the same components, and redundant descriptions thereof will be omitted.

FIG. 1 is a control block diagram showing a configuration of a vehicle according to an exemplary embodiment of the present disclosure.

Referring to FIG. 1, a vehicle 1 according to an embodiment includes a GPS (Global Positioning System) sensor 100 receiving GPS information, a speed sensor 200 that detects the speed of the vehicle 1, an input 300 to receive various commands from a user, a driver assistance system 400 that controls the behavior of the vehicle 1 without driver intervention based on information obtained from the camera 410 and the radar 420, a controller 500 that controls various components of the vehicle 1, a display 600 that provides various information to the driver and a warning unit 700 that provides various warnings to the driver.

The GPS sensor 100 may obtain GPS information by receiving a signal transmitted from a GPS satellite. In this case, the GPS information may include location information of the vehicle 1, and the GPS sensor 100 may transmit GPS information of the vehicle 1 to the controller 500.

The speed sensor 200 may detect the driving speed of the vehicle 1. For example, the speed sensor 200 may detect the wheel speed of the vehicle 1 to obtain the driving speed of the vehicle 1. The speed sensor 200 can transmit vehicle speed information to the controller 500.

The input 300 may be a concept including all the components provided to receive a control command from the occupant, such as various physical buttons provided on the center fascia, a dial operation unit installed on the gearbox, and a touch panel of the display 600. That is, the input 300 may include a microphone as a configuration for a user to input a command by voice.

The input 300 may transmit a user input from a user to the controller 500.

The driver assistance system 400 may include vehicle sensors such as a camera 410 and a radar 420, based on image data obtained from the camera 410 and radar 420 data obtained from the radar 420. Thus, the behavior of the vehicle 1 can be controlled. In this case, the vehicle sensor may include a LIDAR.

Specifically, the controller 500 processes the image data obtained from the camera 410 and the radar 420 data obtained from the radar 420 to obtain information on the surrounding environment of the vehicle 1, controls the speed of the vehicle 1 by controlling the engine and/or the motor based on the surrounding environment information of the vehicle 1, and controls the heading direction of the vehicle 1 by controlling the steering wheel.

The surrounding environment information of the vehicle 1 may include relative position information, relative speed information, and the like of objects (e.g., other vehicles, pedestrians, cyclists, structures, etc.) around the vehicle 1.

The driver assistance system 400 can control the behavior of the vehicle 1 so that the vehicle 1 follows the driving route, and the vehicle 1 is located around the vehicle 1 based on information on the surrounding environment of the vehicle 1. It is possible to control the behavior of the vehicle 1 so as not to collide with the object.

The camera 410 included in the driver assistance system 400 includes a front camera having a view toward the front of the vehicle 1, a rear camera having a view toward the rear of the vehicle 1, and at least one of the side facing having a field of view directed toward the side of the vehicle 1. The radar 420 included in the driver assistance system 400 includes a front radar having a detection field of view facing the front of the vehicle 1, a rear radar having a detection field of view facing the rear of the vehicle 1, and at least one of the lateral radars having a detection field of view.

The driver assistance system 400 may transmit information about the surrounding environment of the vehicle 1 acquired through the camera 410 and the radar 420 to the controller 500.

The controller 500 may control the display 600 and/or the warning unit 700 and/or the driver assistance system 400 based on data and/or information received from the above-described configurations of the vehicle 1.

For this, the controller 500 may include at least one memory in which a program that performs the above-described operation and an operation described later is stored, and at least one processor that executes the stored program. The memory and processor included in the controller 500 can be integrated into a single chip or physically separated.

The display 600 may provide various information to the user based on the control signal of the controller 500. For example, the display 600 may be provided on the center fascia, which is the central area of the dashboard inside the vehicle 1, and the display 600 may be a component of the head unit or a component of a navigation device provided separately from the head unit.

The head unit can process and output an audio signal and a video signal, and can perform a navigation function. Therefore, the head unit is also referred to as an AVN (Audio Video Navigation) device.

The display 600 may display a route guidance screen, that is, a screen necessary to perform a navigation function. In addition, it is possible to further display a screen required to perform an audio function, a video function, or a dialing function.

The display 600 may be implemented as one of various display devices such as a Liquid Crystal Display (LCD), Light Emitting Diode (LED), Plasma Display Panel (PDP), Organic Light Emitting Diode (OLED), and Cathode Ray Tube (CRT).

The display 600 is not limited to the display device described above, and may include a display device or a head-up display provided in a cluster.

The warning unit 700 may include all components that output at least one of a visual warning, an audible warning, or a tactile warning based on a control signal of the controller 500.

For example, the warning unit 700 may include a vibration element such as a vibration element provided on a seat of the vehicle 1 and/or a vibration element provided on a steering wheel of the vehicle 1, and the vibration element can output a tactile warning by vibrating according to the control signal of the controller 500.

As another example, the warning unit 700 may include a speaker provided in the vehicle 1, and the speaker may output an audible warning by outputting a warning sound or a warning speech according to a control signal of the controller 500.

As another example, the warning unit 700 may include a display 600, and the display 600 may output a warning message according to a control signal of the controller 500 or a visual warning by outputting a screen for warning.

That is, although the display 600 and the warning unit 700 are shown separately in FIG. 1, the display 600 may be a component of the warning unit 700.

Likewise, in FIG. 1, the driver assistance system 400 and the controller 500 are shown separately, at least one processor and at least one memory included in the controller 500 may include at least one processor and at least one memory included in the driver assistance system 400.

In addition, various components 100, 200, 300, 400, 500, 600, 700 included in the vehicle 1 may communicate with each other through the vehicle 1 communication network. The vehicle 1 communication network can adopt communication protocol such as MOST (Media Oriented Systems Transport) with a communication speed of up to 24.5 Mbps (Mega-bits per second), FlexRay with communication speed of up to 10 Mbpas, CAN (Controller Area Network) having a communication speed of 125 kbps (kilo-bits per second) to 1 Mbps, and LIN (Local Interconnect Network) having a communication speed of 20 kbps can be adopted. In such a vehicle 1 communication network, not only a single communication protocol such as Most, Play, Can, and Lean can be adopted, but also a plurality of communication protocols may be adopted.

For example, vehicle speed information sensed from the speed sensor 200 may be transmitted to the controller 500 through the vehicle 1 communication network.

In the above, various components of the vehicle 1 have been described. It goes without saying that the vehicle 1 according to the exemplary embodiment may include not only the above-described components, but also all components that can be employed within the scope of the conventional technology.

Hereinafter, an embodiment of a method of controlling the vehicle 1 using various components of the vehicle 1 will be described.

Figure 2:
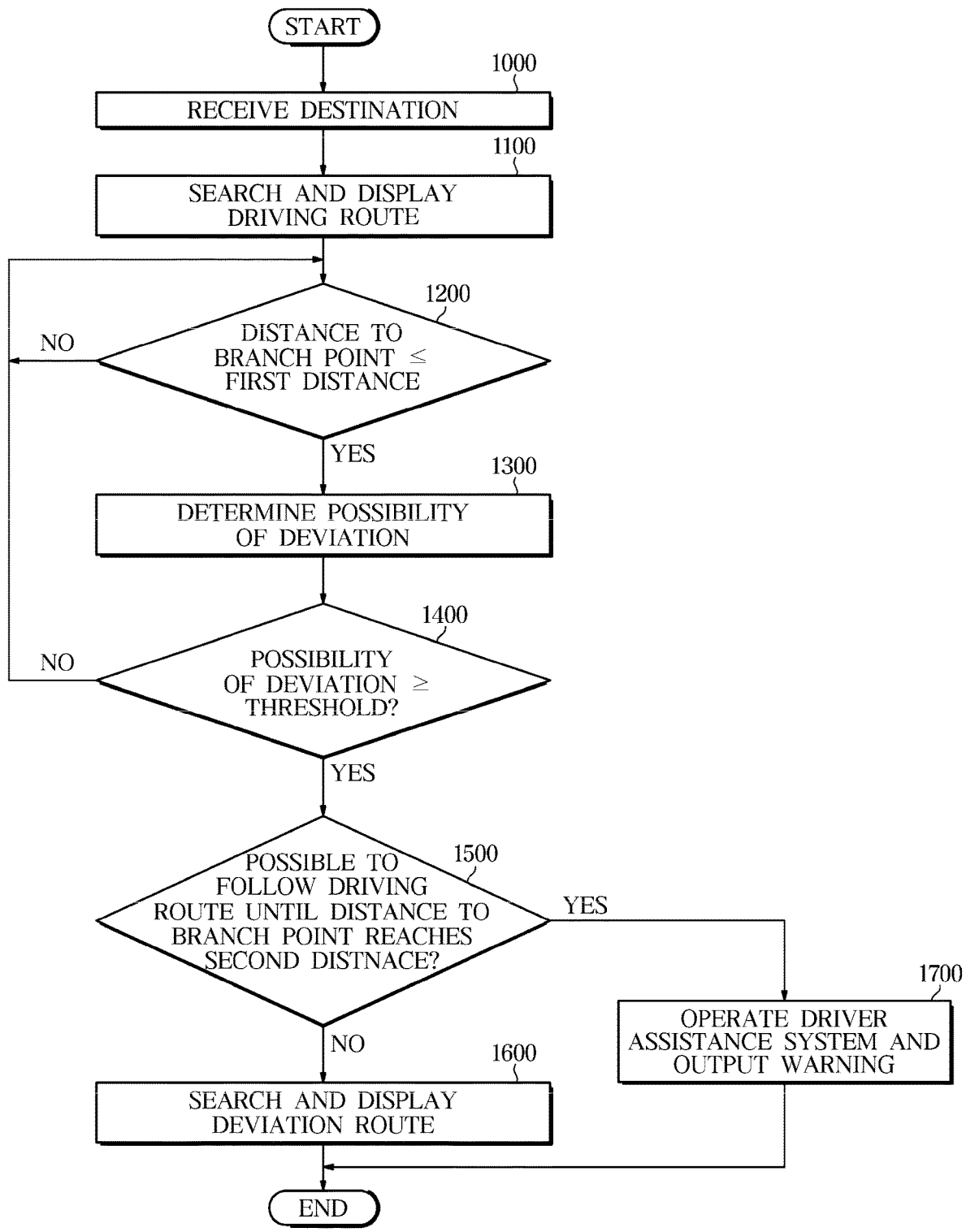
FIG. 2 is a flowchart illustrating a method of controlling a vehicle according to an exemplary embodiment of the present disclosure.
Figure 3:
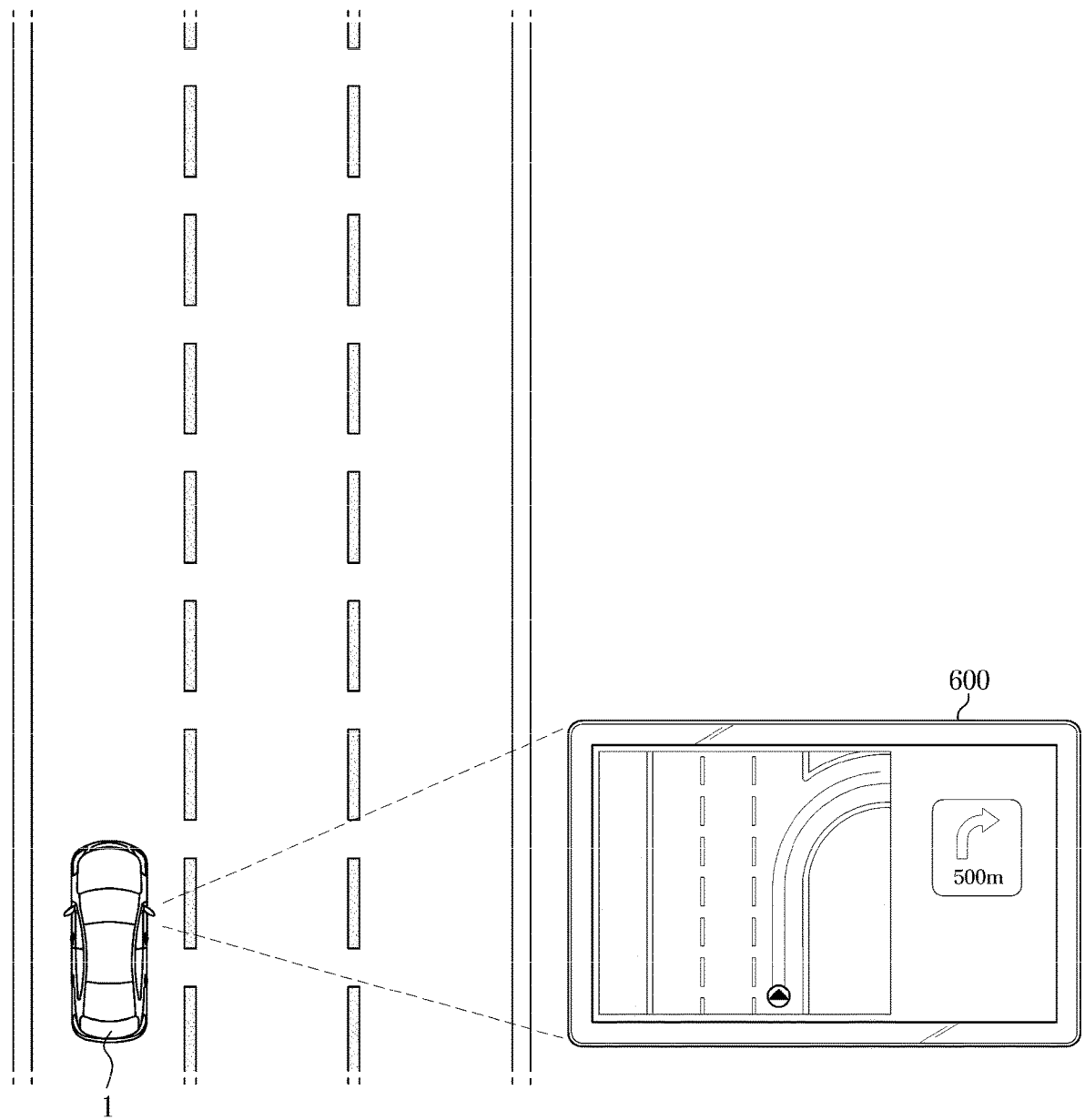
FIG. 3 shows a situation in which a distance between a vehicle and a branch point on a driving route reaches a first distance according to an exemplary embodiment of the present disclosure.
Figure 4:
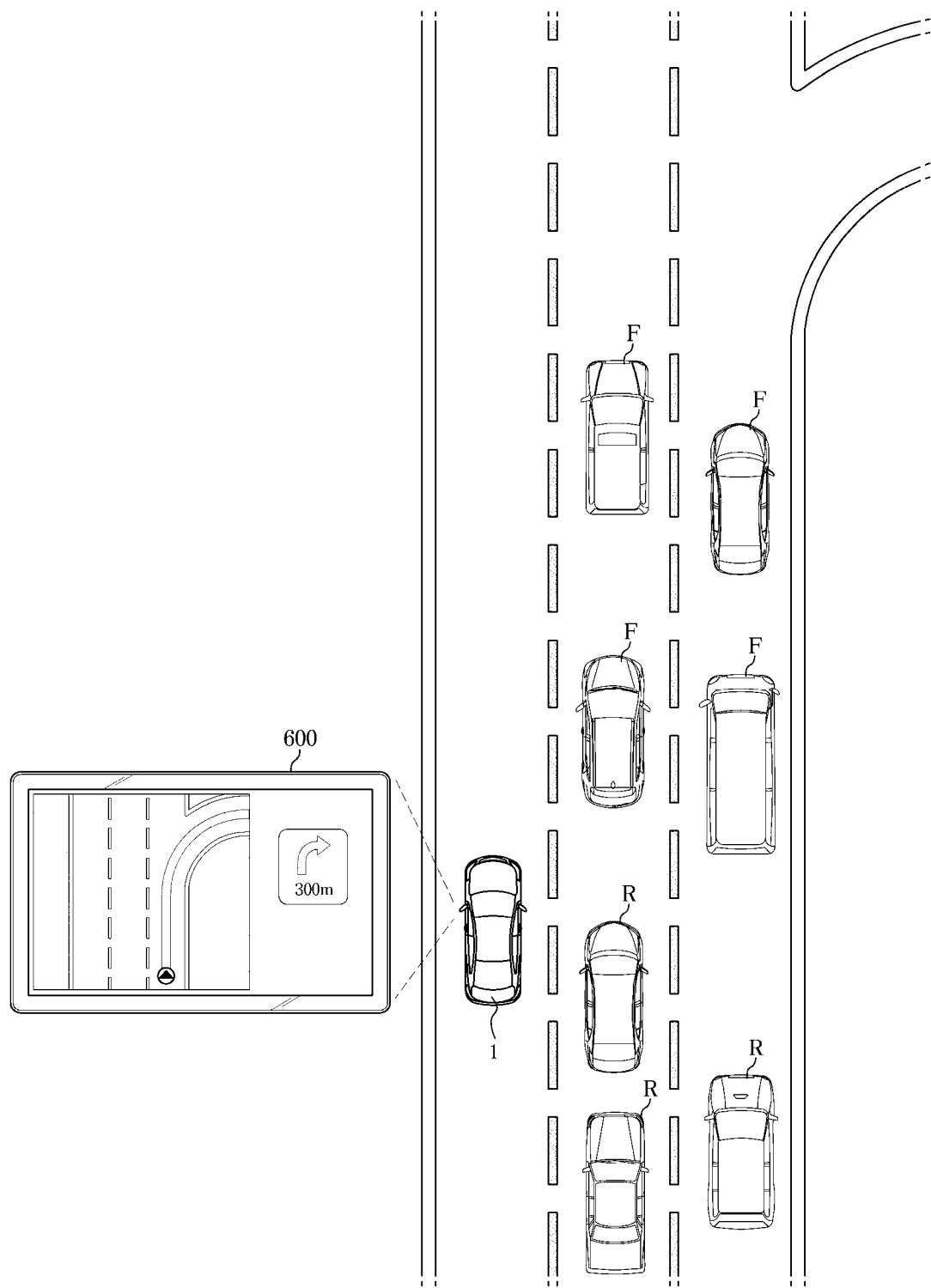
FIG. 4 illustrates a situation in which a vehicle cannot follow a driving route according to an exemplary embodiment of the present disclosure.
Figure 5:
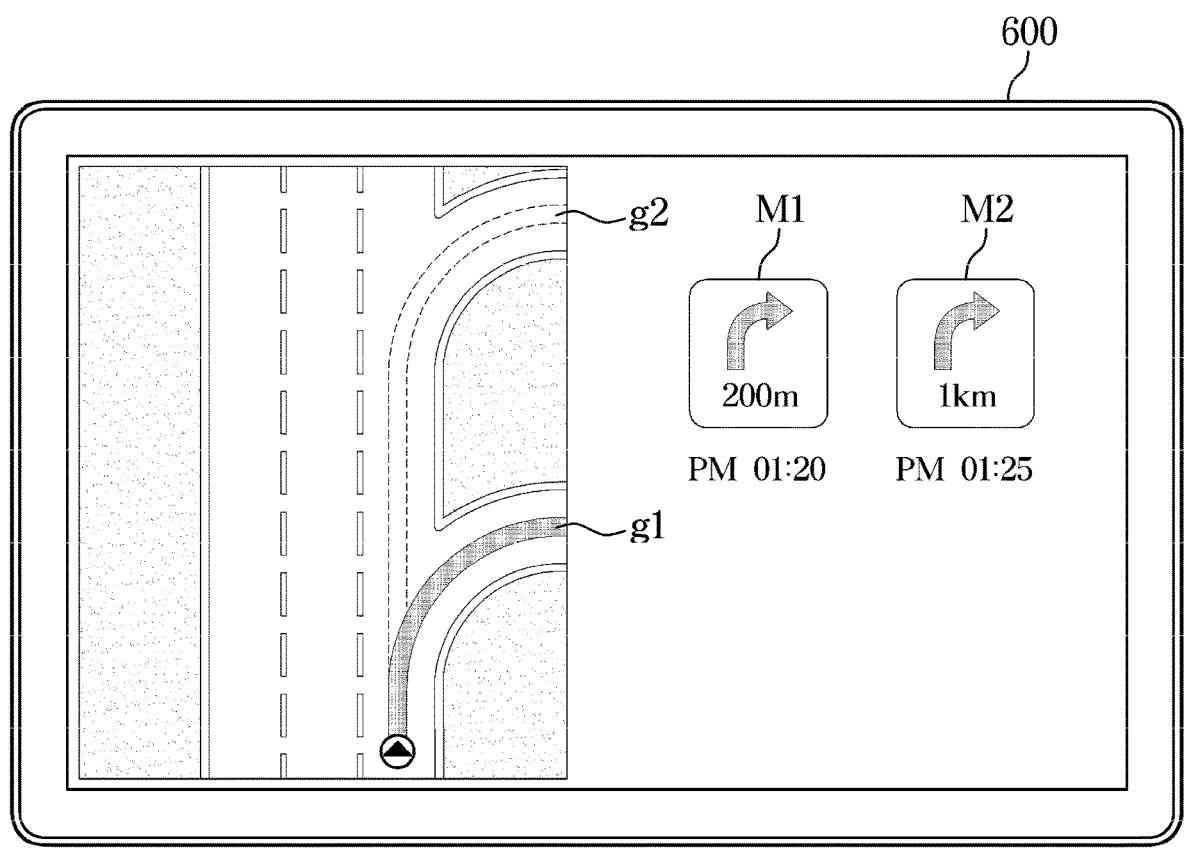
FIG. 5 is a diagram illustrating a screen displayed on a display when a vehicle cannot follow a driving route according to an exemplary embodiment of the present disclosure.
Figure 6:
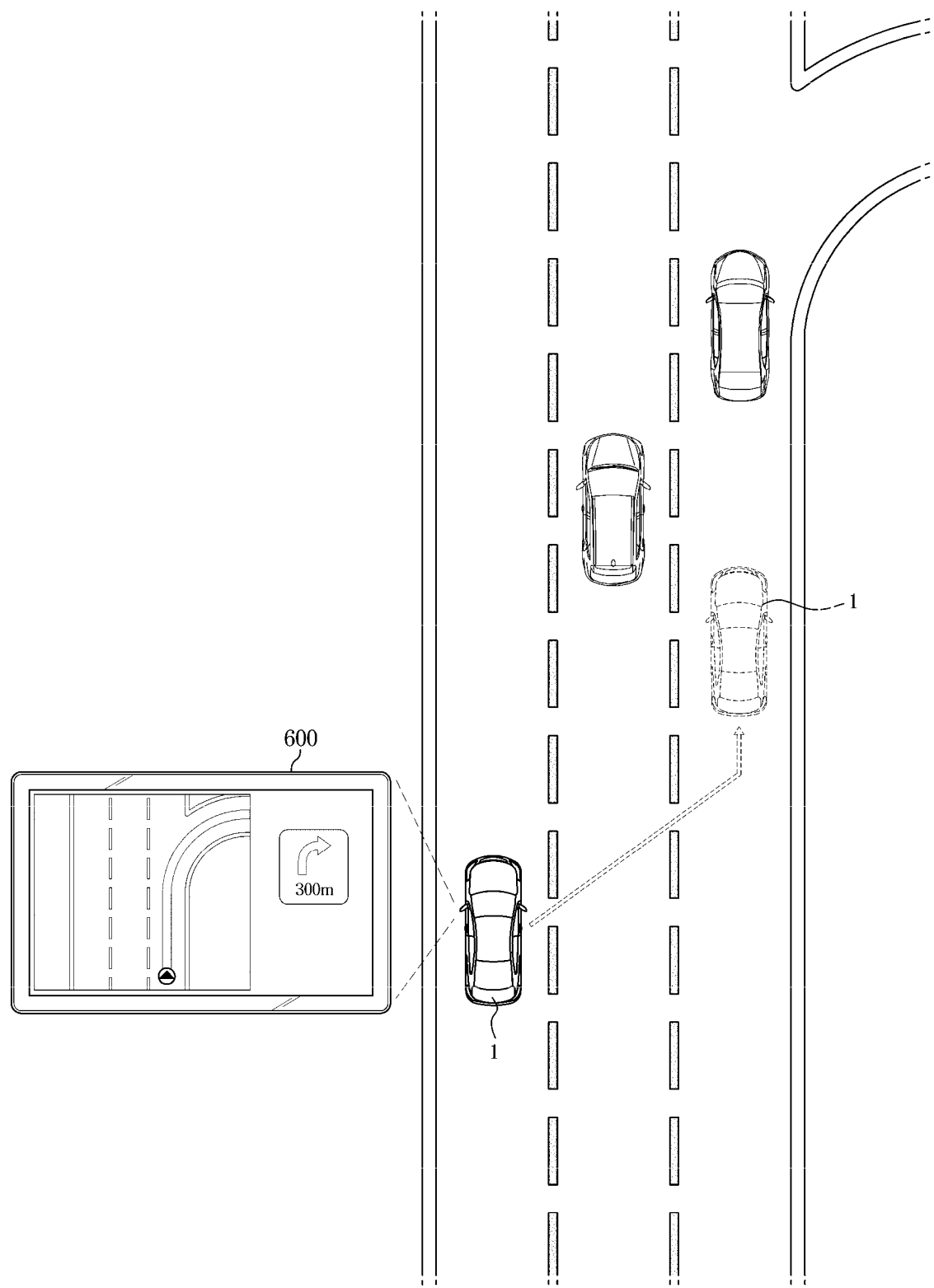
FIG. 6 illustrates a situation in which a vehicle can follow a driving route according to an exemplary embodiment of the present disclosure.
Figure 7:
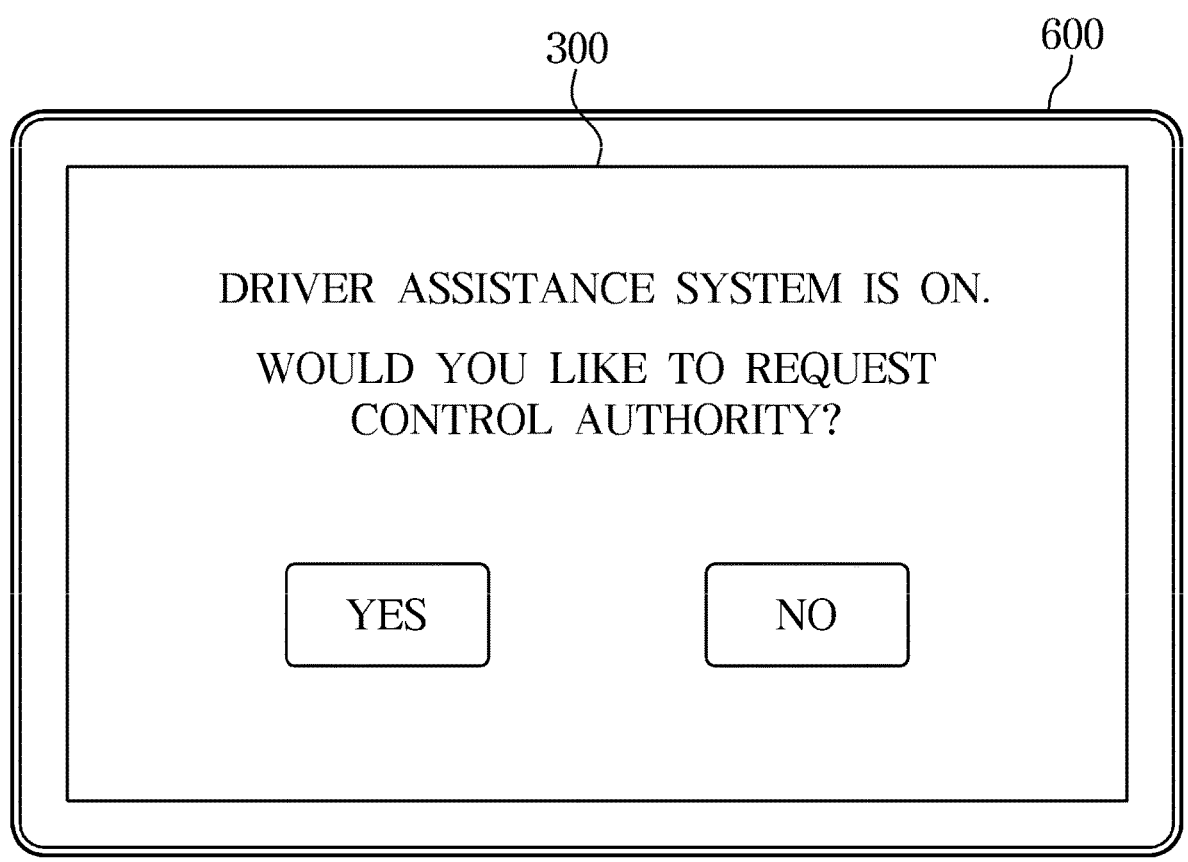
FIG. 7 illustrates a screen displayed on a display in a situation in which a vehicle can follow a driving route according to an exemplary embodiment of the present disclosure.

FIG. 2 is a flowchart illustrating a method of controlling a vehicle according to an exemplary embodiment. FIG. 3 shows a situation in which a distance between a vehicle and a branch point on a driving route reaches a first distance. FIG. 4 illustrates a situation in which a vehicle cannot follow a driving route according to an exemplary embodiment. FIG. 5 is a diagram illustrating a screen displayed on a display when a vehicle cannot follow a driving route according to an exemplary embodiment. FIG. 6 illustrates a situation in which a vehicle can follow a driving route according to an exemplary embodiment. FIG. 7 illustrates a screen displayed on a display in a situation in which a vehicle can follow a driving route according to an exemplary embodiment.

Referring to FIG. 2, a user may input a destination through input 300, and the input 300 may transmit destination information input from the user to the controller 500 (S1000).

The controller 500 may control the display 600 to search for a driving route based on destination information and GPS information and display the searched driving route (S1100).

In this case, the controller 500 may search for an optimal driving route that can minimize the time required to reach the destination based on real-time traffic conditions received from an external traffic server.

The display 600 may display a screen for guiding a driving route based on a control signal from the controller 500. The screen for guiding the driving route may include TBT information, which means direction information such as 11 o'clock, 1 o'clock, right turn, 5 o'clock, U-turn, 8 o'clock, left turn, etc., route guidance phrases to guide the driving direction, and a map image based on a current location and a guide line guiding a driving route.

When the distance between the branch point on the driving route and the vehicle 1 reaches the first distance (S1200), the controller 500 may determine the possibility that the vehicle 1 deviates from the driving route provided by the display 600 (S1300).

The branch point may mean all points at which the driving route of the vehicle 1 can be changed. For example, the branch point may include an intersection in which a right turn and a straight road can be made, an intersection in which a left turn and a straight line can be made, and a point in which a tunnel entry and a tunnel non-entry are possible.

The first distance may be stored in a memory and may include a plurality of distance values. For example, the first distance may be set to 200 m to 1500 m and stored in the memory, but is not limited thereto.

The controller 500 may set the first distance based on factors such as speed limit information of a road on which the vehicle 1 is running, the number of lanes, and the speed of the vehicle 1.

In addition, the controller 500 can set the first distance by comparing the first arrival time reaching the destination when the vehicle 1 follows the driving route and the second arrival time reaching the destination when the vehicle 1 deviates from the driving route at the branch point.

Specifically, the controller 500 may set the first distance in proportion to the difference between the first arrival time and the second arrival time. That is, as the difference between the first arrival time and the second arrival time increases, the first distance may be set larger.

For example, if the time required to reach the destination is 1 hour when following the driving route, and 1 hour and 20 minutes to the destination when deviating from the driving route, the controller 500 may change the first distance to 1500 m. In addition, if the time required to the destination is 1 hour when following the driving route, and 1 hour and 5 minutes to the destination when deviating from the driving route, the controller 500 may change the first distance to 500 m.

In other words, by setting the first distance according to the importance of following the driving route, the more important it is to follow the driving route, the more it is possible to prevent departure of the traveling route in advance.

The controller 500 may determine the possibility that the vehicle 1 deviates from the driving route based on GPS information received from the GPS sensor 100, vehicle speed information received from the speed sensor 200, and surrounding environment information received from the driver assistance system 400.

For example, the controller 500 determines the distance between the vehicle 1 and the branch point on the driving route based on GPS information, determines the arrival time to the branch point based on the vehicle speed information, determines information on the lane on which the vehicle 1 is currently driving based on the surrounding environment information, and determines whether or not the vehicle 1 can change the lane so that the vehicle 1 can follow the driving route at the branch point based on the surrounding environment information.

Referring to FIG. 3, the controller 500 may determine the distance between the vehicle 1 and the branch point as 500 m, and may determine that the vehicle 1 is running on the first lane.

The controller 500 determines that the distance between the branch point and the vehicle 1 has reached a first distance (for example, 500 m), and determines whether the possibility that the vehicle 1 deviates from the driving route is greater than or equal to a preset threshold (S1400).

In order for the vehicle 1 to follow the driving route, it must travel in three lanes, when the vehicle 1 is currently located on the first lane, the controller 500 may determine that the possibility that the vehicle 1 deviates from the driving route is greater than or equal to a preset threshold.

As another example, even if the vehicle is driving on the second lane, when the vehicle speed is equal to or greater than a preset speed, the controller 500 may determine that the possibility that the vehicle 1 deviates from the driving path is equal to or greater than a preset threshold.

As such, the preset threshold value may be stored in the memory of the controller 500 and may be changed according to the user's setting.

If the possibility that the vehicle 1 deviates from the driving route is equal to or greater than a preset threshold (S1400), the controller 500 may determine whether it is possible to control the behavior of the vehicle 1 to follow the driving route through the driver assistance system 400 until the distance between the branch point and the vehicle 1 reaches the second distance (S1500).

In this case, the second distance may be set to 10 m to 200 m and stored in the memory, but is not limited thereto. The controller 500 may set the second distance based on factors such as speed limit information of the road on which the vehicle 1 is running, the number of lanes, and the speed of the vehicle 1.

The controller 500 may set the first distance by comparing the first arrival time to reach the destination when the vehicle 1 follows the driving route with the second arrival time at the destination when the vehicle 1 deviates from the driving route at the branch point.

Specifically, the controller 500 may set the first distance in proportion to the difference between the first arrival time and the second arrival time. That is, as the difference between the first arrival time and the second arrival time increases, the first distance may be set larger.

In other words, by setting the first distance according to the importance of following the driving route, the more important it is to follow the driving route, the more it is possible to prevent deviation of the driving route in advance.

For convenience of description, it is assumed that the first distance is set to 500 m and the second distance is set to 200 m.

Referring to FIG. 4, the controller 500 may determine whether the behavior of the vehicle 1 can be controlled to follow the driving route through the driver assistance system 400 before the distance between the vehicle 1 and the branch point reaches 200 m.

For example, the controller 500 may determine whether the vehicle 1 can change lanes to the first lane through the driver assistance system 400 before the distance between the vehicle 1 and the branch point reaches 200 m.

For example, the driver assistance system 400 may determine that the vehicle 1 can control the behavior of the vehicle 1 so that the vehicle 1 changes lanes to the first lane if the speed of the preceding vehicles F is faster than the speed of the vehicle 1, before the distance between the vehicle 1 and the branch point becomes 200 m.

If the speed of the preceding vehicles F is slower than the speed of the vehicle 1, the driver assistance system 400 determines whether or not it is possible to change the lane by overtaking the preceding vehicles F by increasing the speed of the vehicle 1, and determines whether or not lane can be changed to the rear of the preceding vehicles F by lowering the speed of the vehicle 1 before the distance between the vehicle 1 and the branch point becomes 200 m.

In addition, if the speed of the following vehicles R is faster than the speed of the vehicle 1, the driver assistance system 400 determines whether or not it is possible to change the lane by overtaking the following vehicles R by increasing the speed of the vehicle 1, and determines whether or not lane can be changed to the rear of the following vehicles R by lowering the speed of the vehicle 1 before the distance between the vehicle 1 and the branch point becomes 200 m.

In addition, if the speed of the following vehicles R is slower than the speed of the vehicle 1, the driver assistance system 400 may determine that the behavior of the vehicle 1 can be controlled so that the vehicle 1 changes lanes to the first lane before the distance between the vehicle 1 and the branch point becomes 200 m.

That is, the driver assistance system 400 determines whether the vehicle 1 can control the behavior of the vehicle 1 so that the vehicle 1 changes lanes to the first lane before the distance between the vehicle 1 and the branch point becomes 200 m based on the relative position and relative speed of the preceding vehicles F and the relative position and relative speed of the following vehicles R.

In the case of FIG. 4, it is assumed that the behavior of the vehicle 1 cannot be controlled to follow the driving route through the driver assistance system 400 until the distance between the vehicle 1 and the branch point reaches 200 m.

If the behavior of the vehicle 1 cannot be controlled to follow the driving route through the driver assistance system 400 until the distance between the branch point and the vehicle 1 reaches the second distance (No in S1500), the controller 500 may control the display 600 to search for a deviation route for reaching the destination based on the deviated direction of the vehicle 1 and display the deviation route (S1600).

Specifically, the controller 500 may search for a deviation route assuming that the vehicle 1 goes straight from the branch point.

The controller 500 can navigate the deviation route while controlling the display 600 to display the driving route. That is, by performing the deviation route search in the background, the existing driving route can still be displayed on the display 600 while searching for the deviation route.

Referring to FIG. 5, the controller 500 may control the display 600 to display both the driving route and the deviation route.

This is to prevent confusion when the driver attempts to follow the driving path by determining that the driving path can be followed.

Specifically, the controller 500 may control the display 600 so that both the first guide line g1 guiding the driving route and the second guide line g2 guiding the deviation route are displayed. Further, the controller 500 may control the display 600 to display both the first TBT information M1 guiding the driving route and the second TBT information M2 guiding the deviation route.

The controller 500 controls the display 600 so that the first guide line g1 and the second guide line g2 are distinguished and the first TBT information M1 and the second TBT information M2 are distinguished to prevent confusion of the driver.

For example, the controller 500 may set at least one of a color, thickness, or type of the first guide line g1 and the second guide line g2 to be different.

The controller 500 may set the first guide line g1 as a thick dark solid color line and the second guide line g2 as a thin light colored dotted line, but is not limited thereto.

In addition, the controller 500 may control the display 600 so that the first TBT information M1 is clearly displayed and the second TBT information M2 is displayed blurred.

In addition, the controller 500 may control the display 600 to display the first arrival time (PM 01:20) when following the driving route and the second arrival time (PM 01:25) when following the deviation route.

According to the above-described embodiment, by preliminarily guiding the deviation route before the vehicle 1 deviates from the driving route, even when the driver deviates from the driving route, the deviation route can be easily followed.

In addition, it does not determine whether or not to deviate from the driving route based only on the position, speed, and driving lane of the own vehicle, by determining whether or not the driving route deviates by considering the relationship between other vehicles and the own vehicle, the deviation route can be guided only when necessary by more accurately determining whether the driving route deviates.

Thereafter, when it is determined that the vehicle 1 has deviated from the driving route, the controller 500 can control the display 600 to delete the driving route and display only the deviation route. At this time, the deviation route may become a new driving route.

Referring to FIG. 6, the controller 500 may determine that it is possible to control the behavior of the vehicle 1 to follow the driving route through the driver assistance system 400 until the distance between branch points on the driving route and the vehicle 1 reaches the second distance (YES in S1500).

Until the distance between the branch point on the driving route and the vehicle 1 reaches the second distance, if the behavior of the vehicle 1 can be controlled to follow the driving route through the driver assistance system 400, the controller 500 may control the driver assistance system 400 so that the vehicle 1 follows the driving route (S1700).

Specifically, the user may set whether to intervene in the driver assistance system 400 in advance through input 300 provided in the vehicle 1, and the controller 500 may control the behavior of the vehicle 1 to follow the driving route through the driver assistance system 400 only when a user input allowing intervention of the driver assistance system 400 is received through the input 300.

The driver assistance system 400 may change a lane into a third lane so that the vehicle 1 can follow the driving path by operating according to a control command of the controller 500.

In this way, the driver assistance system 400 is operated only when the user desires active intervention of the driver assistance system 400 to increase the user's satisfaction.

In addition, when it is possible to follow the driving route, it is possible to prevent deviation of the driving route in advance through the driver assistance system 400.

When controlling the driver assistance system 400, the controller 500 prevents a safety accident by depriving the driver of driving control authority, and restores the driving control authority to the driver when a user input requesting the reversion of control authority is received through the input 300.

Referring to FIG. 7, when the driver assistance system 400 has the right to control the driving of the vehicle 1, the controller 500 can notify the driver that the driver assistance system 400 is operating by controlling the display 600, and may provide an interface for receiving a user input requesting restoration of control authority.

In addition, if the behavior of the vehicle 1 can be controlled to follow the driving route through the driver assistance system 400 until the distance between the branch point on the driving route and the vehicle 1 reaches the second distance (YES in S1500), the controller 500 may control the warning unit 700 to output at least one of a visual warning, an audible warning, and a tactile warning (S1700).

For example, the controller 500 may output a control signal for vibrating a vibration element provided in a seat of the vehicle 1 and/or a vibration element provided in a steering wheel. Further, the controller 500 may output a warning sound and/or a warning sound by controlling a speaker provided in the vehicle 1. In addition, the controller 500 may control display 600 to output a warning message or output a screen for warning.

According to the above-described embodiment, the driver may control the vehicle 1 to follow the driving route according to the warning output from the warning unit 700.

According to the above-described embodiment of the vehicle 1 and its control method, it is possible to more accurately determine whether or not the driving route is deviated by considering information of other vehicles without considering only the information of the own vehicle. In addition, by intervening the driver assistance system 400 to change the path of the vehicle 1 or output a warning to the driver, departure of the driving path can be efficiently prevented. In addition, even when deviation of the driving route is expected, confusion for the driver can be prevented by providing the driver with a deviation route in advance.

On the other hand, the disclosed exemplary embodiments may be implemented in a form of a recording medium for storing instructions executable by a computer. Instructions may be stored in a form of program code and, when executed by a processor, may generate a program module to perform the operations of the disclosed exemplary embodiments. The recording medium may be implemented as a non-transitory computer-readable recording medium.

The non-transitory computer-readable recording medium includes all kinds of recording media in which instructions which may be decoded by a computer. For example, there may be read only memory (ROM), random access memory (RAM), a magnetic tape, a magnetic disk, a flash memory, an optical data storage device, and the like.

As described above, the disclosed exemplary embodiments have been described with reference to the accompanying drawings. Although exemplary embodiments of the present disclosure have been shown and described, it would be appreciated by those skilled in the art that changes may be made to these exemplary embodiments without departing from the principles and spirit of the present disclosure, the scope of which is defined in the claims and their equivalents.

According to an exemplary embodiment, it is possible to improve the driver's convenience by preventing deviation of the driving route provided by the navigation device.

In addition, by being provided with a driving path after departure before the vehicle deviates from the driving path, the driver can easily follow the driving path after departure.

What is claimed is:

1. A vehicle, comprising:
    a display;
    at least one output device configured to output at least one of a visual warning, an audible warning, or a tactile warning;
    and
    a controller configured to:
        control a behavior of the vehicle based on surrounding environment information acquired through a vehicle sensor,
        control the display to display a driving route searched based on a destination according to a user input,
        when a distance between a branch point on the driving route and the vehicle reaches a first distance, determine a possibility that the vehicle deviates from the driving route based on at least one of Global Positioning System (GPS) information, vehicle speed information, or the surrounding environment information and determine whether the vehicle can follow the driving route until the distance between the branch point and the vehicle reaches a second distance, when the possibility is greater than or equal to a preset threshold and the vehicle cannot follow the driving route, search for a deviation route for reaching the destination based on a deviated direction and control the display to display the deviation route, when the vehicle can follow the driving route, control the at least one output device to output at least one of the visual warning, the audible warning, or the tactile warning, when the vehicle follows the driving route, calculate a first arrival time for the vehicle to reach the destination, when the vehicle deviates from the driving route at the branch point, calculate a second arrival time for the vehicle to reach the destination, and set the first distance in proportion to a difference between the first arrival time and the second arrival time.

2. The vehicle according to claim 1, wherein the controller is configured to control the display to display the driving route while searching for the deviation route.

3. The vehicle according to claim 1, wherein the controller is configured to control the display to display both of the driving route and the deviation route at the same time.

4. The vehicle according to claim 3, wherein the controller is configured to control the display to distinguish a first guide line guiding the driving route and a second guide line guiding the deviation route.

5. The vehicle according to claim 4, wherein the controller is configured to set at least one of color, thickness, or type of the first guide line and the second guide line to be different.

6. The vehicle according to claim 1, wherein, when the vehicle can follow the driving route, the controller is configured to control the vehicle to follow the driving route until the distance between the branch point on the driving route and the vehicle reaches the second distance.

7. The vehicle according to claim 6, wherein the controller is configured to:

deprive a driver's control authority when controlling the vehicle to follow the driving route, and restore the driver's control authority when a user input for requesting restoration of the control authority is received.

8. The vehicle according to claim 1, wherein the controller is configured to control the vehicle to follow the driving route only when a user input for allowing intervention of a driver assistance system is received.

9. A method for controlling a vehicle, the method comprising:

controlling a behavior of the vehicle based on surrounding environment information acquired through a vehicle sensor;

searching for a driving route based on a destination according to a user input;

controlling a display to display the driving route;

when a distance between a branch point on the driving route and the vehicle reaches a first distance, determining a possibility that the vehicle deviates from the driving route based on at least one of Global Positioning System (GPS) information, vehicle speed information, or the surrounding environment information and determining whether the vehicle can follow the driving route until the distance between the branch point and the vehicle reaches a second distance;

when the vehicle can follow the driving route, outputting at least one of a visual warning, an audible warning, or a tactile warning;

calculating a first arrival time for the vehicle to reach the destination when the vehicle follows the driving route;

calculating a second arrival time for the vehicle to reach the destination when the vehicle deviates from the driving route at the branch point;

setting the first distance in proportion to a difference between the first arrival time and the second arrival time;

upon determining that the possibility is greater than or equal to a preset threshold and the vehicle cannot follow the driving route, searching for a deviation route for reaching the destination based on a deviated direction; and controlling the display to display the deviation route.

10. The method according to claim 9, wherein the searching for the deviation route is performed while controlling the display to display the driving route.

11. The method according to claim 9, wherein the controlling the display includes controlling the display to display both of the driving route and the deviation route at the same time.

12. The method according to claim 11, wherein the controlling the display to display both of the driving route and the deviation route includes controlling the display to distinguish a first guide line guiding the driving route and a second guide line guiding the deviation route.

13. The method according to claim 12, wherein the controlling the display to distinguish the first guide line guiding the driving route and the second guide line guiding the deviation route includes setting at least one of color, thickness, or type of the first guide line and the second guide line to be different.

14. The method according to claim 9, further comprising, upon determining that the vehicle can follow the driving route, controlling the vehicle to follow the driving route until the distance between the branch point on the driving route and the vehicle reaches the second distance.

15. The method according to claim 14, wherein the controlling the vehicle to follow the driving route is performed only when a user input for allowing intervention of a driver assistance system is received.

16. The method according to claim 14, wherein the controlling the vehicle to follow the driving route includes:

depriving a driver's control authority; and restoring the driver's control authority when a user input for requesting restoration of the control authority is received.

* * * * *